United States Patent
Khaleghi

(10) Patent No.: US 11,582,037 B2
(45) Date of Patent: *Feb. 14, 2023

(54) APPARATUS AND METHODS FOR SECURE DISTRIBUTED COMMUNICATIONS AND DATA ACCESS

(71) Applicant: The Notebook, LLC, Santa Monica, CA (US)

(72) Inventor: Karen Elaine Khaleghi, Pacific Palisades, CA (US)

(73) Assignee: The Notebook, LLC, Pacific Palisades, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/939,677

(22) Filed: Jul. 27, 2020

(65) Prior Publication Data

US 2021/0028927 A1 Jan. 28, 2021

Related U.S. Application Data

(63) Continuation of application No. 16/521,973, filed on Jul. 25, 2019, now Pat. No. 10,735,191.

(51) Int. Cl.
*H04L 9/08* (2006.01)
*H04L 9/32* (2006.01)
(Continued)

(52) U.S. Cl.
CPC ........... *H04L 9/088* (2013.01); *G06F 9/5016* (2013.01); *G06F 9/542* (2013.01); *H04L 9/0643* (2013.01); *H04L 9/3234* (2013.01)

(58) Field of Classification Search
None
See application file for complete search history.

(56) References Cited

U.S. PATENT DOCUMENTS 3,594,066 A  7/1971  Cook
3,649,765 A  3/1972  Rabiner
(Continued)

FOREIGN PATENT DOCUMENTS

KR  10-2018-0004312 A  1/2018

OTHER PUBLICATIONS

Healow Home Page, dated Apr. 17, 2016, 3 pages—https://web.archive.org/web/20160417210345/https://healow.com/apps/jsp/webview/signIn.jsp.

(Continued)

*Primary Examiner* — Brandon Hoffman
(74) *Attorney, Agent, or Firm* — Knobbe, Martens, Olson & Bear LLP

(57) ABSTRACT

A secure access control system configured to control access to sensitive data stored on disparate systems is disclosed. A first entity is designated to control access to second entity data. An authentication token, generated using a key derivation function, is used to authenticate the first entity. The authenticated first entity is granted access to second entity data. An access control interface is generated configured to selectively grant or withdraw access to second entity data. The access control interface identifies entities associated with respective access controls. The access control interface is instantiated on a first entity device. Activation indications of access controls is received over a network. Access to second entity data is accordingly granted or withdrawn. Access control transition event rules and/or access control transition time rules are retrieved. Using monitored events and the access control transition event rules, and/or a monitored current time and the access control transition time rules, a determination is made as to transition access control of the second entity data first entity to the second entity.

23 Claims, 9 Drawing Sheets

(51) Int. Cl.
   *G06F 9/54* (2006.01)
   *G06F 9/50* (2006.01)
   *H04L 9/06* (2006.01)

(56) References Cited

U.S. PATENT DOCUMENTS

| | | | |
|---|---|---|---|
| 4,682,361 | A | 7/1987 | Selbach |
| 5,293,584 | A | 3/1994 | Brown |
| 5,579,393 | A | 11/1996 | Conner |
| 5,633,910 | A | 5/1997 | Cohen |
| 5,823,948 | A | 10/1998 | Ross, Jr. |
| 5,924,074 | A | 7/1999 | Evans |
| 6,039,688 | A | 3/2000 | Douglas |
| 6,047,254 | A | 4/2000 | Ireton |
| 6,234,964 | B1 | 5/2001 | Iliff |
| 6,290,646 | B1 | 9/2001 | Cosentino |
| 6,292,771 | B1 | 9/2001 | Haug |
| 6,411,933 | B1 | 6/2002 | Maes |
| 6,544,294 | B1 | 4/2003 | Greenfield |
| 6,941,271 | B1 | 9/2005 | Soong |
| 7,174,332 | B2 | 2/2007 | Baxter |
| 7,302,490 | B1 | 11/2007 | Gupta |
| 7,647,555 | B1 | 1/2010 | Wilcox |
| 7,770,117 | B1 | 8/2010 | Uy |
| 7,783,072 | B2 | 8/2010 | Work |
| 7,788,605 | B1 | 8/2010 | Shoemaker |
| 8,255,225 | B2 | 8/2012 | Byford |
| 8,374,992 | B2 | 2/2013 | Meyyappan et al. |
| 8,533,511 | B2 | 9/2013 | Ma et al. |
| 8,606,595 | B2 | 12/2013 | Udani |
| 8,775,213 | B2 | 7/2014 | Hughes |
| 8,826,123 | B2 | 9/2014 | Audet |
| 8,868,436 | B2 | 10/2014 | Gotthardt |
| 9,070,357 | B1 | 6/2015 | Kennedy |
| 9,158,335 | B2 | 10/2015 | Zheng |
| 9,252,962 | B1 | 2/2016 | Valeti |
| 9,256,588 | B1 | 2/2016 | Moscovich et al. |
| 9,256,719 | B2 | 2/2016 | Serini |
| 9,305,155 | B1 | 4/2016 | Vo |
| 9,619,616 | B2 | 4/2017 | Raduchel |
| 9,658,756 | B2 | 5/2017 | Freeman |
| 9,733,801 | B2 | 8/2017 | Audet |
| 9,788,799 | B2 | 10/2017 | Wagner |
| 9,899,038 | B2 | 2/2018 | Khaleghi |
| 9,928,379 | B1 * | 3/2018 | Hoffer .................. G16H 50/20 |
| 9,959,556 | B1 | 5/2018 | Cordell |
| 10,014,004 | B2 | 7/2018 | Khaleghi |
| 10,032,120 | B2 | 7/2018 | Collins |
| 10,121,345 | B1 | 11/2018 | Fields et al. |
| 10,187,762 | B2 | 1/2019 | Khaleghi |
| 10,235,998 | B1 | 3/2019 | Khaleghi |
| 10,484,845 | B2 | 11/2019 | Khaleghi |
| 2001/0034639 | A1 | 10/2001 | Jacoby |
| 2001/0037219 | A1 | 11/2001 | Malik |
| 2002/0010679 | A1 | 1/2002 | Felsher |
| 2002/0012526 | A1 | 1/2002 | Sai |
| 2002/0022975 | A1 | 2/2002 | Blasingame |
| 2002/0026329 | A1 | 2/2002 | Saito |
| 2002/0029157 | A1 | 3/2002 | Marchosky |
| 2002/0035486 | A1 | 3/2002 | Huyn |
| 2002/0062225 | A1 | 5/2002 | Siperco |
| 2002/0078044 | A1 | 6/2002 | Song |
| 2002/0082865 | A1 | 6/2002 | Bianco |
| 2002/0116188 | A1 | 8/2002 | Amir |
| 2002/0138271 | A1 | 9/2002 | Shaw |
| 2002/0145742 | A1 | 10/2002 | Koenig et al. |
| 2003/0115054 | A1 | 6/2003 | Iso-Sipila |
| 2003/0135095 | A1 | 7/2003 | Iliff |
| 2003/0140044 | A1 | 7/2003 | Mok |
| 2004/0034869 | A1 | 2/2004 | Wallace |
| 2004/0059599 | A1 | 3/2004 | McIvor |
| 2004/0133560 | A1 | 7/2004 | Simske |
| 2004/0153289 | A1 | 8/2004 | Casey |
| 2004/0243443 | A1 | 12/2004 | Asano |
| 2005/0055399 | A1 | 3/2005 | Savchuk |
| 2005/0096906 | A1 | 5/2005 | Barzilay |
| 2005/0137723 | A1 | 6/2005 | Liu |
| 2005/0147214 | A1 | 7/2005 | Goerg et al. |
| 2005/0149569 | A1 | 7/2005 | Hariharan et al. |
| 2005/0165626 | A1 | 7/2005 | Karpf |
| 2005/0172022 | A1 | 8/2005 | Brown |
| 2006/0001666 | A1 | 1/2006 | Cake et al. |
| 2006/0011399 | A1 | 1/2006 | Brockway et al. |
| 2006/0047497 | A1 | 3/2006 | Chen |
| 2006/0052674 | A1 | 3/2006 | Eisenstein |
| 2006/0085347 | A1 | 4/2006 | Yiachos |
| 2006/0148528 | A1 | 7/2006 | Jung |
| 2006/0253281 | A1 | 11/2006 | Letzt |
| 2007/0024454 | A1 | 2/2007 | Singhal |
| 2007/0074114 | A1 | 3/2007 | Adjali |
| 2007/0124135 | A1 | 5/2007 | Schultz |
| 2007/0168413 | A1 | 7/2007 | Barletta |
| 2007/0208800 | A1 | 9/2007 | Frohlich |
| 2007/0216708 | A1 | 9/2007 | Mackay |
| 2007/0276270 | A1 | 11/2007 | Tran |
| 2008/0066973 | A1 | 3/2008 | Furuki |
| 2008/0104048 | A1 | 5/2008 | Surendran |
| 2008/0126426 | A1 | 5/2008 | Manas |
| 2008/0133233 | A1 | 6/2008 | Tsu Bu Ra |
| 2008/0195495 | A1 | 8/2008 | Rubin et al. |
| 2008/0212746 | A1 | 9/2008 | Gupta |
| 2008/0244453 | A1 | 10/2008 | Cafer |
| 2008/0301176 | A1 | 12/2008 | Fanelli et al. |
| 2008/0313536 | A1 | 12/2008 | Larsen |
| 2008/0319750 | A1 | 12/2008 | Potter |
| 2009/0055735 | A1 | 2/2009 | Zaleski |
| 2009/0077045 | A1 | 3/2009 | Kirchmeier |
| 2009/0117922 | A1 | 5/2009 | Bell |
| 2009/0292554 | A1 | 11/2009 | Schultz |
| 2009/0313347 | A1 | 12/2009 | Engel |
| 2010/0036871 | A1 | 2/2010 | Beckey et al. |
| 2010/0076333 | A9 | 3/2010 | Burton |
| 2010/0169108 | A1 | 7/2010 | Karkanias |
| 2010/0228656 | A1 | 9/2010 | Wasserblat et al. |
| 2010/0262435 | A1 | 10/2010 | Smith |
| 2010/0286490 | A1 | 11/2010 | Koverzin |
| 2011/0040155 | A1 | 2/2011 | Guzak |
| 2011/0068934 | A1 | 3/2011 | Weng et al. |
| 2011/0091050 | A1 | 4/2011 | Hanai |
| 2011/0099189 | A1 | 4/2011 | Barraclough |
| 2011/0099490 | A1 | 4/2011 | Barraclough |
| 2011/0148668 | A1 | 6/2011 | Li |
| 2011/0184781 | A1 | 7/2011 | Hussam |
| 2011/0202866 | A1 | 8/2011 | Huang |
| 2011/0239158 | A1 | 9/2011 | Barraclough |
| 2012/0005099 | A1 | 1/2012 | Beckey |
| 2012/0112879 | A1 | 5/2012 | Ekchian |
| 2012/0198385 | A1 | 8/2012 | Audet |
| 2012/0299926 | A1 | 11/2012 | Hodes |
| 2012/0306648 | A1 | 12/2012 | Karaffa |
| 2012/0306925 | A1 | 12/2012 | Hwang |
| 2012/0323589 | A1 | 12/2012 | Udani |
| 2012/0323796 | A1 | 12/2012 | Udani |
| 2013/0009907 | A1 | 1/2013 | Rosenberg |
| 2013/0024206 | A1 | 1/2013 | Hughes |
| 2013/0085781 | A1 | 4/2013 | Navani |
| 2013/0111331 | A1 | 5/2013 | Rosen et al. |
| 2013/0124192 | A1 | 5/2013 | Lindmark |
| 2013/0163956 | A1 | 6/2013 | Medhurst |
| 2013/0185071 | A1 | 7/2013 | Chen |
| 2013/0257777 | A1 | 10/2013 | Benko |
| 2013/0275151 | A1 | 10/2013 | Moore |
| 2013/0325493 | A1 | 12/2013 | Wong |
| 2014/0019119 | A1 | 1/2014 | Liu |
| 2014/0068489 | A1 | 3/2014 | Wyland |
| 2014/0074454 | A1 | 3/2014 | Brown |
| 2014/0081667 | A1 | 3/2014 | Joao |
| 2014/0136233 | A1 | 5/2014 | Atkinson |
| 2014/0143671 | A1 | 5/2014 | Kovalick |
| 2014/0164310 | A1 | 6/2014 | Chen |
| 2014/0164784 | A1 | 6/2014 | Sinderbrand |
| 2014/0172707 | A1 | 6/2014 | Kuntagod |
| 2014/0172804 | A1 | 6/2014 | Kaufman |
| 2014/0195221 | A1 | 7/2014 | Frank |

(56) References Cited

U.S. PATENT DOCUMENTS

| | | |
|---|---|---|
| 2014/0244277 A1 | 8/2014 | Krishna Rao |
| 2014/0249860 A1 | 9/2014 | Rynchek |
| 2014/0253467 A1 | 9/2014 | Hicks |
| 2014/0304005 A1 | 10/2014 | Hughes |
| 2014/0379374 A1 | 12/2014 | Vinals |
| 2015/0058013 A1 | 2/2015 | Pakhomov |
| 2015/0072330 A1 | 3/2015 | Rosenberg |
| 2015/0100339 A1 | 4/2015 | Kim |
| 2015/0134346 A1 | 5/2015 | Hyde |
| 2015/0149095 A1 | 5/2015 | Otvos |
| 2015/0164436 A1 | 6/2015 | Maron |
| 2015/0169717 A1 | 6/2015 | Wang |
| 2015/0178457 A1 | 6/2015 | Grimley |
| 2015/0228277 A1 | 8/2015 | Anhari |
| 2015/0257681 A1 | 9/2015 | Shuster |
| 2015/0258892 A1 | 9/2015 | Wu |
| 2015/0310455 A1 | 10/2015 | Vinals |
| 2015/0314681 A1 | 11/2015 | Riley, Sr. |
| 2015/0363657 A1 | 12/2015 | Shigemura |
| 2015/0379200 A1 | 12/2015 | Gifford |
| 2016/0004820 A1 | 1/2016 | Moore |
| 2016/0012196 A1 | 1/2016 | Mark |
| 2016/0080403 A1 | 3/2016 | Cunningham |
| 2016/0143594 A1 | 5/2016 | Moorman |
| 2016/0297359 A1 | 10/2016 | Kirsch et al. |
| 2016/0342741 A1 | 11/2016 | Chin |
| 2017/0007167 A1 | 1/2017 | Kostic et al. |
| 2017/0060997 A1 | 3/2017 | Lee |
| 2017/0161439 A1 | 6/2017 | Raduchel |
| 2017/0190251 A1 | 7/2017 | Wu |
| 2017/0195637 A1 | 7/2017 | Kusens |
| 2017/0200449 A1 | 7/2017 | Penilla et al. |
| 2017/0235888 A1 | 8/2017 | Rahman |
| 2017/0359551 A1 | 12/2017 | Shaw |
| 2018/0027006 A1 | 1/2018 | Zimmermann |
| 2018/0032997 A1 | 2/2018 | Gordon |
| 2018/0060899 A1 | 3/2018 | Das |
| 2018/0090155 A1 | 3/2018 | Moriya |
| 2018/0144763 A1 | 5/2018 | Khaleghi |
| 2018/0193652 A1 | 7/2018 | Srivastava |
| 2018/0200142 A1 | 7/2018 | Freeman |
| 2018/0211059 A1* | 7/2018 | Aunger ............... H04L 63/0428 |
| 2018/0267700 A1 | 9/2018 | Kaditz |
| 2018/0285542 A1 | 10/2018 | Xiao |
| 2018/0322265 A1 | 11/2018 | Kwok-Suzuki et al. |
| 2019/0006040 A1 | 1/2019 | Fleming |
| 2019/0035132 A1 | 1/2019 | Dirksen |
| 2019/0095632 A1 | 3/2019 | Seinen |
| 2019/0149962 A1 | 5/2019 | Khaleghi |
| 2019/0208354 A1 | 7/2019 | Raduchel |
| 2019/0239789 A1 | 8/2019 | Jung |
| 2019/0267003 A1 | 8/2019 | Khaleghi |

OTHER PUBLICATIONS

Matheson, "Watch Your Tone—Voice-Analytics Software Helps Customer-Service Reps Build Better 2 Rapport with Customers," MIT News Office, httg://news.mit.edu/2016/startup-cogito-voice-analyticscall-centers-otsd-0120; Jan. 20, 2016; 4 pages.

Mullin, "Rewriting Life—Voice Analysis Tech Could Diagnose Disease," 3 httgs://www.technologyreview.com/s/603200/voice-analysis-tech-could-diagnose-disease/; Jan. 19, 2017; 9 pages.

Nield, "Scientists Can Now Diagnose Depression Just by Listening to Your Voice," IEEE Transactions 4 on Affective Computing; Science Alert, https://www.sciencealert.com/this-comguter-grogram-can-tellwhen-someone-s-deoressed-bv-their-soeeach-oatterns; Jul. 11, 2016; 4 pages.

PCT International Search Report and Written Opinion, regarding International Application No. PCT/US2020/017781 dated Jun. 2, 2020, 12 pages.

PCT International Search Report and Written Opinion, regarding International Application No. PCT/US2019/019438, dated Jun. 14, 2019, 19 pages.

Scherer et al., "Investigating Voice Quality as a Speaker-Independent Indicator of Depression and PTSD", University of Southern California, Institute for Creative Technologies; 5 pages; Los Angeles, California, 2013.

Shah, Bhakti, "eClinicalWorks Invest $25 Million in Patient Engagement," dated Feb. 6, 2013, 3 pages—https://www.eclinicalworks.com/pr-eclinicalworks-invests-25-million/.

* cited by examiner

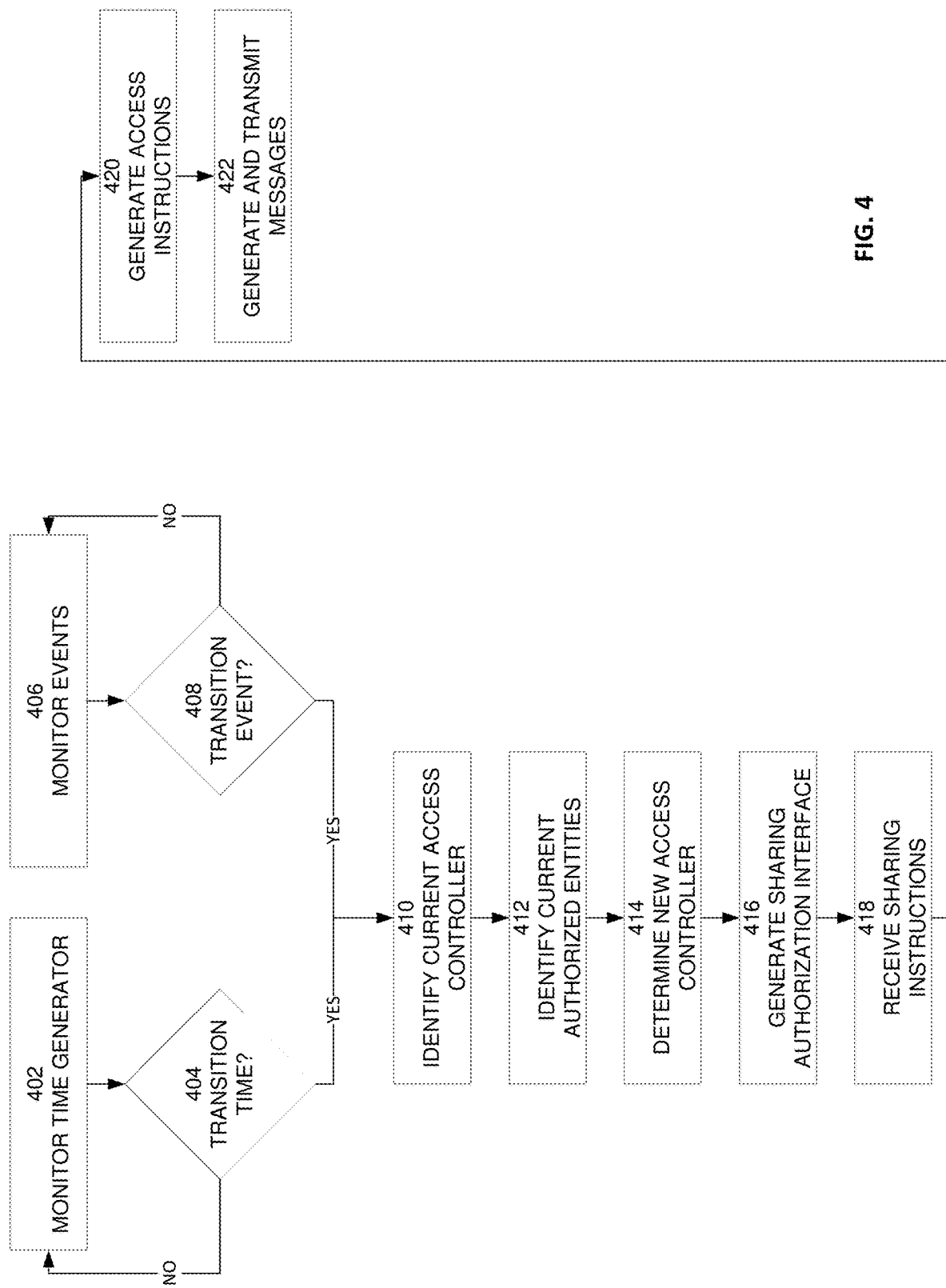

ACCESS AUTHORIZATION INTERFACE

| | HISTORICAL DATA | FUTURE DATA |
|---|---|---|
| FAMILY MEMBERS | | |
| JANE DOE | ☒ | ☒ |
| MARK BROWN | ☒ | ☐ |
| JI-WOO KIM | ☒ | ☐ |
| SOFIA GARCIA | ☒ | ☒ |
| ADD NEW MEMBER | | |
| MEDICAL SERVICE PROVIDERS | | |
| DR. ABE ALPHA | ACCESS REQUIRED | ☐ |
| DR. BERNICE BETA | ACCESS REQUIRED | ☒ |
| GAMMA HOSPITAL | ACCESS REQUIRED | ☐ |
| ADD NEW PROVIDER | | |
| INSURANCE | | |
| ACME CITY HOSPITAL | ☒ | ☒ |
| ADD NEW ENTITY | | |

FIG. 7

APPARATUS AND METHODS FOR SECURE DISTRIBUTED COMMUNICATIONS AND DATA ACCESS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

This document relates to systems and techniques for secure communication, messaging, and data sharing using cryptographic techniques.

Description of the Related Art

Electronic communications, such a short messaging service (SMS) messages and multimedia service (MMS) messages, have become an ever more important medium for sharing information and data. However, conventional techniques fail to provide adequate techniques for securely controlling the distribution of such information and data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure relate to systems and methods configured to control the communication and sharing of data from disparate systems in a secure and authenticated manner.

An aspect of the present disclosure relates to a secure access control system configured to control access to sensitive data stored on disparate systems. A first entity is designated to control access to second entity data. An authentication token, generated using a key derivation function, is optionally used to authenticate the first entity. The authenticated first entity is granted access to second entity data. An access control interface is generated configured to selectively grant or withdraw access to second entity data. The access control interface identifies entities associated with respective access controls. The access control interface is instantiated on a first entity device. Activation indications of access controls is received over a network. Access to second entity data is accordingly granted or withdrawn. Access control transition event rules and/or access control transition time rules are retrieved. Using monitored events and the access control transition event rules, and/or a monitored current time and the access control transition time rules, a determination is made as to transition access control of the second entity data first entity to the second entity.

An aspect of the present disclosure relates to a secure access control system configured to control access to sensitive data stored on disparate data sources, secure access control system comprising: a network interface; at least one computing device; computer readable memory including instructions operable to be executed by the at least one computing device to perform a set of actions, configuring the at least one computing device to at least: receive, via the network interface, locators associated with respective disparate data sources that store encrypted data associated with a second entity; determine a first entity that is designated to control access to second entity data; receive, via the network interface, an authentication token from the first entity; compare the received authentication token with a stored authentication token; at least partly in response to the comparison indicating that the received authentication token corresponds to the stored authentication token, grant the first entity with access to at least a portion of the second entity data; generate an access control interface configured to selectively grant or withdraw access to second entity data, wherein the access control interface comprises an identification of a first plurality of entities associated with respective access controls; at least partly in response to determining that the first entity is designated to control access to second entity data, enable the access control interface to be instantiated on a first entity device; receive, via the network interface, from the first entity device activation indications provided via the access control interface of one or more access controls associated with respective entities in the first plurality of entities; grant or withdraw access to the second entity data in accordance with the received activation indications of one or more access controls associated with respective entities in the first plurality of entities from the first entity device; enable respective entities in the first plurality of entities, granted access by the first entity, to access over a network the second entity data from a first plurality of disparate data sources; retrieve access control transition event rules; retrieve access control transition time rules; monitor one or more events; monitor a current time; based at least in part on the monitored one or more events and the access control transition event rules, and/or the monitored current time and the access control transition time rules, determine whether access control of the second entity data is to be transitioned from the first entity to the second entity; based at least in part on a determination that the access control of the second entity data is to be transitioned from the first entity to the second entity, enable the access control interface to be instantiated on a second entity device; receive from the second entity device activation indications provided via the access control interface of one or more access controls associated with respective entities in the first plurality of entities; grant or withdraw access to the second entity data in accordance with the received activation indications of one or more access controls associated with respective entities in the first plurality of entities from the second entity device; and enable respective entities in the first plurality of entities, granted access by the second entity to second entity data, to access over a network the second entity data from at least a portion of the first plurality of disparate data sources.

An aspect of the present disclosure relates to a computer implemented method of securely communicating data comprising: under control of a hardware computing device configured with specific computer executable instructions: receiving, via a network interface, locators associated with a plurality of systems that store encrypted data associated with a second entity; determining a first entity that is designated to control access to second entity data; receiving, via the network interface, an authentication token from the first entity; at least partly in response to determining that the authentication token is valid, granting the first entity with access to at least a portion of the second entity data; generating an access control interface configured to selectively grant or withdraw access to second entity data, wherein the access control interface comprises an identification of a first plurality of entities associated with respective access controls; at least partly in response to determining that the first entity is designated to control access to second entity data, enabling the access control interface to be instantiated on a first entity device; receiving, via the network interface, from the first entity device activation indications provided via the access control interface of one or more access controls associated with respective entities in the first plurality of entities; granting or withdrawing access to the second entity data in accordance with the received activation indications of one or more access controls associated with respective entities in the first plurality of entities from the first entity device; enabling respective entities in the first plurality of entities, granted access by the first entity, to access over a network the second entity data from a first plurality of disparate data sources; retrieving access control transition event rules and/or retrieving access control transition time rules; monitoring one or more events and/or monitoring a current time; based at least in part on the monitored one or more events and the access control transition event rules, and/or the monitored current time and the access control transition time rules, determining whether access control of the second entity data is to be transitioned from the first entity to the second entity; based at least in part on a determination that the access control of the second entity data is to be transitioned from the first entity to the second entity, enabling the access control interface to be instantiated on a second entity device; receiving from the second entity device activation indications provided via the access control interface of one or more access controls associated with respective entities in the first plurality of entities; granting or withdrawing access to the second entity data in accordance with the received activation indications of one or more access controls associated with respective entities in the first plurality of entities from the second entity device; and enabling respective entities in the first plurality of entities, granted access by the second entity to second entity data, to access over a network the second entity data from at least a portion of the first plurality of disparate data sources.

An aspect of the present disclosure relates to a non-transitory computer-readable storage medium storing computer executable instructions that when executed by a processor cause the processor to perform operations comprising: determine a first entity that is designated to control access to second entity data, wherein the second entity data is stored in encrypted form; receive authentication data from the first entity; use the receive authentication data to authenticate the first entity; at least partly in response to authenticating the first entity, grant the first entity with access to at least a portion of the second entity data; generate an access control interface configured to selectively grant or withdraw access to second entity data, wherein the access control interface comprises an identification of a one or more entities associated with respective access controls; at least partly in response to determining that the first entity is designated to control access to second entity data, enable the access control interface to be instantiated on a first entity device; receive from the first entity device activation indications provided via the access control interface of one or more access controls associated with respective entities in the one or more entities; grant or withdraw access to the second entity data in accordance with the received activation indications of one or more access controls associated with respective entities in the one or more entities from the first entity device; enable respective entities in the one or more entities, granted access by the first entity, to access over a network the second entity data; retrieve access control transition event rules and/or retrieve access control transition time rules; monitor one or more events and/or monitor a current time; based at least in part on the monitored one or more events and the access control transition event rules, and/or the monitored current time and the access control transition time rules, determine whether access control of the second entity data is to be transitioned from the first entity to the second entity; based at least in part on a determination that the access control of the second entity data is to be transitioned from the first entity to the second entity, enable the access control interface to be instantiated on a second entity device; receive from the second entity device activation indications provided via the access control interface of one or more access controls associated with respective entities in the one or more entities; grant or withdraw access to the second entity data in accordance with the received activation indications of one or more access controls associated with respective entities in the one or more entities from the second entity device; and enable respective entities in the one or more entities, granted access by the second entity to second entity data, to access over a network the second entity data from one or more data sources.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

FIG. 4 illustrates an example process for transitioning access control to secure data.

FIG. 7 illustrates an example access authorization interface.

DETAILED DESCRIPTION

Figure 1A:
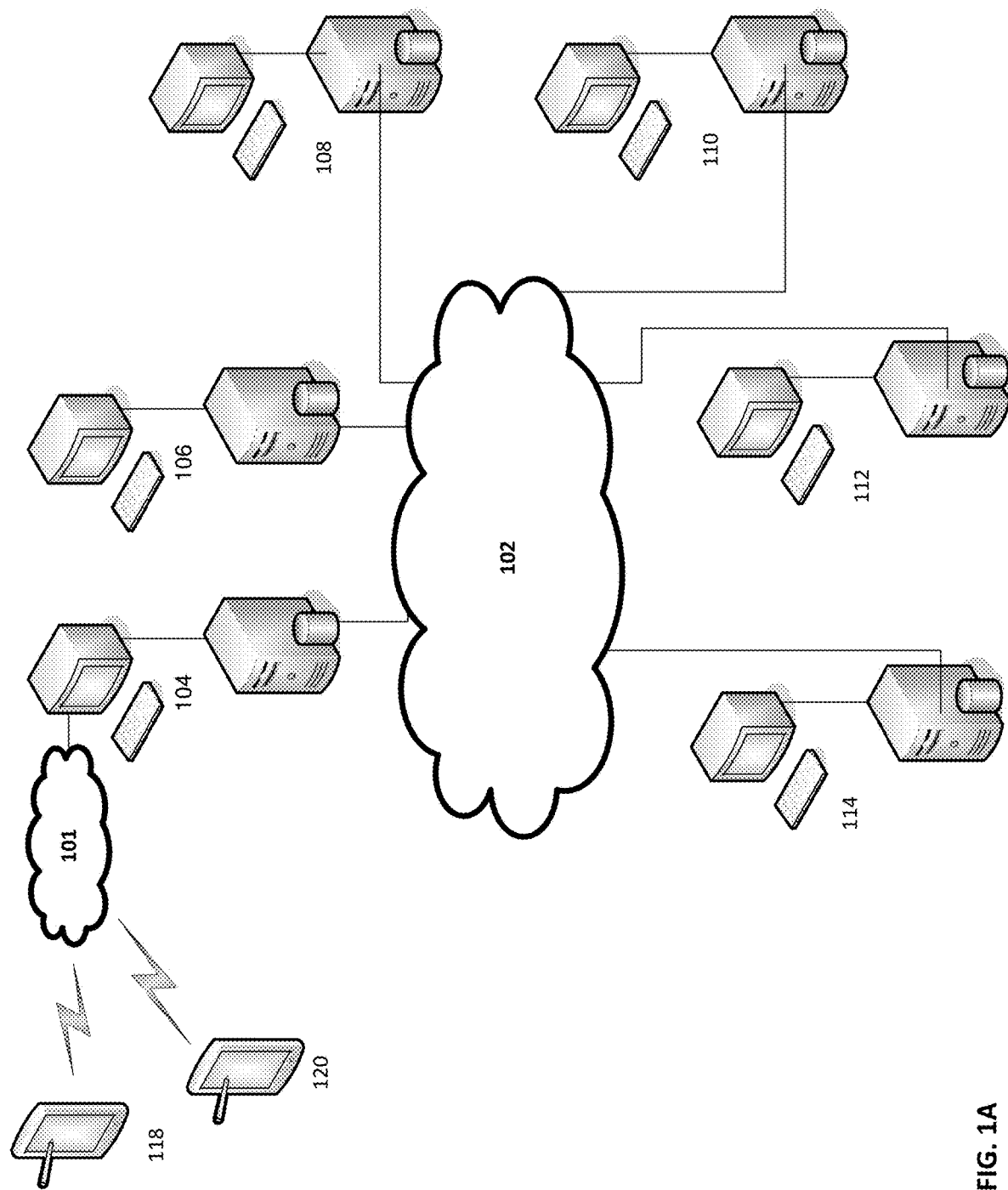
FIG. 1A illustrates an example architecture.

A communication management system is described configured to enable communication of data and information, including multimedia data, among disparate systems in a secure and controlled manner. Such data and information may be shared using a variety of communication channels, including by way of example, short messaging service (SMS) messages, multimedia service (MMS) messages, email, database-to-database transfers, HTML documents, cloud storage downloads, and/or the like. Such data and information (collectively referred to sometimes herein collectively as data) may be encrypted at the data source, further encrypted for communication over a network, and decrypted at the receiving system. Also disclosed herein are systems and methods for providing validated secure data access using authentication tokens.

For example, the communication management system may be configured to manage communications among user devices, database systems, and document servers. By way of illustration, the user devices may include mobile devices (e.g., smart phones, tablet computers, laptops, etc.), desktop computers, wearable devices, smart televisions, and/or the like. As will be described elsewhere herein, a user device may be equipped with a variety of sensors (e.g., sound, image, orientation, pressure, light, acceleration, and/or other sensors) configured to detect user input and interaction with the user terminals, and which may be used to authenticate the user. A user device may include one or more touch screens configured to display user interfaces and data and receive user input via touch. A user device may include a physical keyboard and control buttons. A user device may include one or more microphones to receive voice data and/or commands, and one or more speakers to play audible content.

A user device may include a camera configured to capture, record, and/or stream video (and/or still image) data (which may be stored or streamed in association with captured audio data) to other systems. For example, the camera may be a front facing camera of a phone, a PC/laptop webcam, or other image capture device. A user device may include or be configured with media players that enable the terminal to play video and/or audio content, and display still images. A user device may include various authentication modules, such as a face identification module, a fingerprint reader/authenticator module (e.g., an optical or capacitive fingerprint sensor that generates a representative of the ridges and valleys that make up a fingerprint), a voice authentication module, and/or a password authentication module.

The user terminals may be associated with various user-types, such as, by way of example, a patient, patient caretaker, patient family member, medical service provider, system administrator, insurance administrator, and/or the like.

The database systems may, by way of example, include databases associated with medical service providers (e.g., storing a patient's medical records, including medication records, test result records, imaging records (e.g., CAT scans, x-rays, ultrasounds, and/or the like), diagnosis, medical treatment plans, medical service provider notes, name, contact information, insurance information, social security number, etc.), insurance companies, contact record mangers, and/or the like. The data stored by the database systems may encrypt data using cryptographic techniques, which may include sensitive data that is required my law or regulation to be protected from unauthorized access. A data encryption module may be configured to generate or access encryption keys and encrypt data using the encryption keys, and decrypt encrypted data using decryption keys. Data encryption may encode data so that unauthorized users are prevented from viewing the data (e.g., as plain text or as decrypted multimedia). However, authorized users, once authenticated, they may be enabled to decrypt and view the encrypted data.

Optionally, encryption may be performed using symmetric keys, or public/private key pairs. The data may be encrypted using a cryptographic hash, such as, by way of example, MD5, SHA1, SHA256, SHA384, or SHA512 hashes. Hashing utilizes an algorithm or function that takes as input data and returns a fixed-size bit string (a hash).

Optionally, in order for a system to access and/or decrypt such encrypted data, the system and/or system may need to be authenticated. Optionally, a trusted third party may be utilized in authenticating a system or user. Optionally, multi-factor authentication (MFA) may be utilized in which a requesting system or user is granted access only after multiple items of authentication data/factors is transmitted to an authentication service. For example, the multi-factor authentication may use knowledge-based authentication (e.g., a password, information that the user knows but that is not generally known (e.g., name of first pet, name of favorite artist, etc.), possession-based (e.g., something that only the requesting system or user has (e.g., a smart card or dongle with a unique identifier stored thereon, a software application configured to generate a one-time code)), and/or inherence (something only the user is, such as a fingerprint, iris print, voice signature, etc.).

For example, a software application may generate a one-time password based on a time factor using an HMAC-based (hash-based message authentication codes-based) one-time Password algorithm (HOTP). For example, the HOTP algorithm may be executed by a token (one-time password generator), which may be a dedicated token generator device or may be a software application hosted by a user device or other system described herein. The token generates a numeric code. The token may use a secret seed/key and a moving factor which, in event-based OTP, may be a counter. The counter is stored in the token and on the hosting server. The counter in the token increments in response to an event (e.g., when the button on the token is pressed), while the counter on the server is incremented when a one-time password is successfully validated.

The one-time password is calculated by feeding the counter into the HMAC algorithm using the secret seed as the key. Optionally, the SHA-1 hash function may be utilized in the HMAC to generate a 160-bit value which may then be reduced down to fewer decimal digits (e.g., 6 or 8 decimal digits), which may be displayed by the token.

Optionally, a time-based OTP (TOTP) algorithm may be utilized. The TOTP algorithm is similar to the HOTP algorithm but the moving factor is time (rather than a counter). A TOTP algorithm may generate a one-time password that is valid for a time step (e.g., 15 seconds, 30 seconds, 60 seconds, or other time period).

By way of illustrative example, optionally, the user may enter a secret PIN as a seed (knowledge-based authentication). The one-time use password may be generated using the secret PIN (e.g., a 4-8 digit PIN), and a secret number (e.g., 16 bit hex code) created when the token was initialized. The PIN may have been pre-registered with the communication management system and the secret number may be transmitted to the communication management system. The generated one time password may be displayed to the user. The user may enter or submit the password, which may be transmitted to the communication management system. The communication management system (or other designated system) may verify the password, as the system knows the current time, the secret number generated when the token was initialized, and the user PIN. To compensate time differences, the system may accept passwords within a certain period prior to and after the current time (e.g., +/−2 minutes). A given password will only be accepted once. The system may lock out a user or user device have a threshold number of failed authentication attempts.

Thus, instead of using a username and a password to access each protected resource, the user may be authenticated a first time using a username and a password (e.g., within a session of limited duration), a time-limited token may be generated and provided in return by the protected resource, and the token may for further authentication during the session (without having to pass the username and password each time during the session). Optionally, such token may be used to authenticate the user on certain other protected resources without having to pass sensitive username and password to such other resources.

However, optionally, the authentication token may be in the form of a username and a password.

As will be described, access to certain data stored in one or more databases may be transitioned from a first user to a second user in response to a time-based event and/or a physical event. For example, when a woman becomes pregnant, the women may be provided access to medical records associated with her pregnancy and more specifically associated with the embryo. The woman may optionally be enabled to selectively share access to such medical records with another person or entity (e.g., medical service providers, insurance providers, etc.). For example, the woman may be enabled to share all her medical records with her partner, may be enabled to restrict such sharing to pregnancy specific records, may be enabled to restrict such sharing to embryo-specific records (e.g., ultrasounds, maternal blood tests, etc.), and so on.

Then, once the child is born, the child's medical records may be automatically be made accessible to the mother and to the other parent (if there is another parent on record) or legal guardian. Optionally, when the child is born, certain medical records that had been made accessible to a person designated by the user may be restricted so that the designated person no longer has access to such records unless the woman confirms that access is to be provided.

When a certain time-based event occurs, such as the child reaching the age of majority (e.g., 18 years old as determined by the child's medical records or other records), the access to the child's records may be automatically transitioned to the child, and the parent's access to the child's records (including those from birth) may be automatically withdrawn. Optionally, access to the child's records may be automatically withdrawn from medical service providers that are not the holder/creator of the records. The child may be prompted to indicate whether access to the child's records should be continued for those who previously had access.

Optionally, at each access transition stage, an opt-in list is automatically generated. For example, a list of all those who had been authorized to access to the child's data may be listed, where each listed entity may be presented with an opt-in control. If the opt-in control is de-activated, then data access may be denied to the corresponding entity. Optionally, two opt-in controls are provided, one for historical data (e.g., data that existed prior to the transition or prior to the activation of the historical opt-in control), and one for future data. Optionally, as will be discussed, certain entities may only have an associated historical opt-in control, and certain entities may only have an associated future opt-in control. Some entities may not have any opt-in control as data sharing with such entities may not be changed by the child.

Optionally, the list may be generated so as to categorize entities (e.g., parent, other family member, caretaker, medical service provider, insurance provider, etc.) that currently have, prior to the transition, access. There may be certain entities that have access to the child's data for which the child cannot withdraw access (e.g., a hospital, insurance company, etc.) for at least historical data. Such entities may be included in the list, but without an historical opt-in control. By way of further example, there may be certain entities that are legally permitted access to the child's future data for which the child cannot withdraw access. Such entities may be included in the list, but without a future opt-in control.

Optionally, where the child cannot withdraw access, text describing the reason such access cannot be withdrawn may be located and rendered in the list, via a tool tip, pop-up window, or the like.

The user's opt-in inputs may be recorded in a user record, and access granted or denied accordingly.

FIG. 1A illustrates an example architecture. A secure multimedia distributed content management system 104 (which may be a cloud based system comprising one or more servers that are co-located and/or that are geographically dispersed) may host one or more applications that when executed cause a variety of the processes (e.g., the backend processes) described herein to execute. Optionally, the cloud system may include one or more Apache Hadoop clusters, optionally including a Hadoop distributed file system (HDFS) and a Hadoop MapReduce parallel processing framework. The system 104 may be configured to process and store large amounts of data that would not be effectively by conventional system. The system 104 may be configured to process and store large amounts of structured data, unstructured data, and/or semi-structured data. The data may relate to the patient-related data (including sound and/or video recordings, scans, test results, contact information, calendaring information, biographical data, patient-related team data, etc.) disclosed herein. The clusters may comprise master nodes (e.g., a name node, a job tracker, etc.), and slave nodes (e.g., data nodes, task trackers, etc.). A given data node serves data over a network using the distributed file system (e.g., HDFS) protocol. The file system may utilize a TCP/IP layer for communication. The distributed file system may store large files across multiple data node machines and may store copies of data on multiple hosts to enhance reliability and data availability.

With respect to the optional Hadoop implementation, other systems may submit tasks to the job tracker, which in turn, distributes the tasks to available task tracker nodes. Optionally, the job tracker may attempt to distribute a given task to a node in geographic proximity to the needed data. While the foregoing example refers to Hadoop clusters and related components, other distributed platforms may optionally be used in addition or instead to process and store data, such as large amounts of data including structured, unstructured, and/or semi-structured data, (e.g., distributed platforms utilizing Bashreduce, Qizmt, Spark, Disco Project, etc.).

The secure multimedia distributed content management system 104 may communicate over one or more wired and/or wireless local and/or wide area networks (e.g., the Internet) 101 with one or more user terminals 118, 120. The user terminals 118, 120 may be wireless mobile devices, such as smart phones, tablets, laptops, wearables, or the like. The wireless mobile devices may optionally be equipped with wireless interfaces to communicate over WiFi, Bluetooth™, other local area wireless networks, other personal area networks, cellular networks, or the like. The wireless mobile devices may optionally be equipped one or more antennas connected to respective wireless interfaces. The antennas may be located within the housing of the mobile device, and or on the housing surface of the mobile device. The user terminals 118, 120 may be wired or wireless non-mobile devices, such as a desktop computer, a fixed or large networked television, a game console, or the like. The user terminals 118, 120 may include a variety of sensors (e.g., sound, image, fingerprint, orientation, pressure, light, acceleration, and/or other sensors) configured to detect user input and interaction with the user terminals 118, 120. The user terminals 118, 120 may include touch screens configured to display user interfaces and data and receive user input via touch. The user terminals may include physical keyboards. The user terminals 118, 120 may include one or more microphones to receive voice data and commands, and one or more speakers to play audible content. The user terminals 118, 120 may include a camera configured to capture, record, and/or stream video data (which may be stored or streamed in association with captured audio data) to other systems, such as the secure multimedia distributed content management system 104. The user terminals 118, 120 may be associated with the various user-types discussed herein, such as patients, family members of patients, patient caretakers, medical personnel, medical facilities, other members of a support network, or insurance providers.

The secure multimedia distributed content management system 104 may communicate over one or more wired and/or wireless local and/or wide area networks 102 with one or more remote servers or computing systems 106, 108, that may be associated with medical service providers, one or more medical databases 108, 110, insurance systems 112, and/or third party authentication systems 114. The network 101 and the network 102 may be the same or different networks.

Figure 1B:
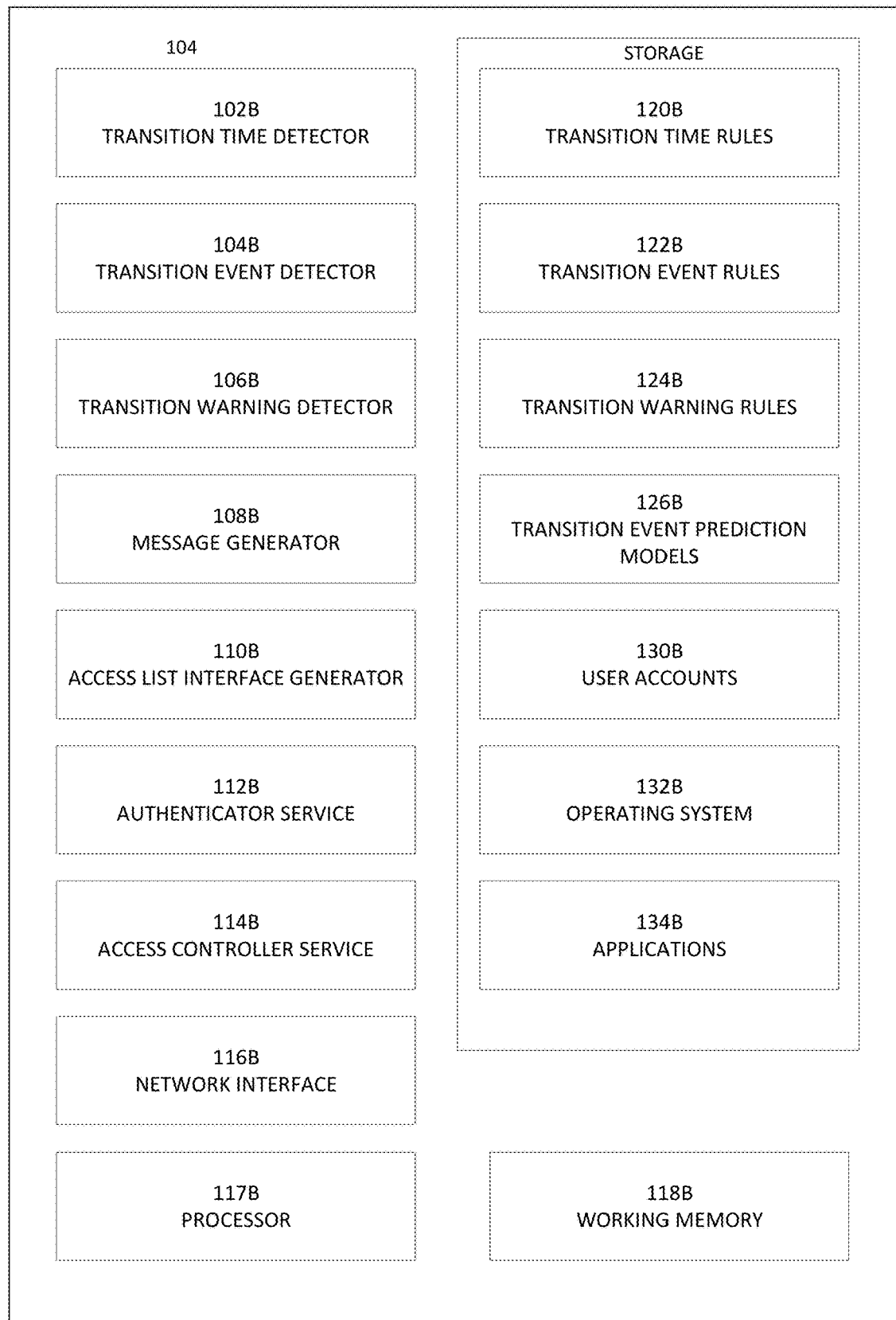
FIG. 1B illustrates an example secure multimedia distributed content management system architecture.

FIG. 1B illustrates an example secure multimedia distributed content management system 104 architecture. Optionally, the secure multimedia distributed content management system 104 may comprise a hosted computing environment that includes a collection of physical computing resources that may be remotely accessible and may be rapidly (e.g., in real time) provisioned as needed, for example in response to computer resource demands (sometimes referred to as a "cloud" computing environment). The model performance evaluation and prediction aggregation system may also include a secure data store. The secure data store is optionally a hosted storage environment that includes a collection of physical data storage devices that may be remotely accessible and may be rapidly (e.g., in real time) provisioned as needed for example in response to data storage resource demands (sometimes referred to as "cloud" storage).

In this example, the secure multimedia distributed content management system 104 includes one or more processors 117B (e.g., one or more RISC (Reduced Instruction Set Computing), CISC (Complex Instruction Set Computer), scalar, array/vector, and/or parallel processing device, and/or a hybrid thereof). A given process 117B may include one or multiple cores. The secure multimedia distributed content management system 104 includes working memory 118B, which may include main working memory and cache memory. The main working memory may include DRAM (Dynamic RAM) and/or SRAM (Static RAM). Cache memory may also include DRAM and/or SRAM, although SRAM may be preferred due to its typically higher storage and access speed.

The secure multimedia distributed content management system 104 may further include one or more network interfaces 116B to interface to the Internet, a Local Area Network (LAN), and/or Wide Area Network (WAN) through a variety of connections including by way of example, one or more of standard telephone lines, LAN or WAN links (e.g., 802.11, T1, T3, OC, and/or the like), broadband connections (e.g., ISDN, Frame Relay, ATM, Gigabit Ethernet, Ethernet-over-SONET, and/or the like), wireless connections, or some combination of any or all of the above. Connections may be established using a variety of communication protocols (e.g., TCP/IP, IPX, SPX, NetBIOS, Ethernet, ARCNET, SONET, SDH, Fiber Distributed Data Interface (FDDI), a version of IEEE 802.11, CDMA, GSM, 5G, direct asynchronous connections, and/or the like). The network interface 116B may be configured to communicate over a network using a gateway or tunneling protocol such as Secure Socket Layer (SSL) or Transport Layer Security (TLS).

The secure multimedia distributed content management system 104 may include a transition time detector 102B, a transition event detector 104B, a transition warning detector 106B, a message generator 108B an access list interface generator 110B, an authenticator service 112B, and/or an access controller service 114B. The secure multimedia distributed content management system 104 may include a memory storage system, which may include non-volatile storage. The non-volatile storage may include solid state, magnetic, and/or optical storage devices. The storage system may store transition time rules 120B, transition event rules 122B, transition warning rules 124B, transition event prediction models 126B, user account records 130B, one or more operating systems 132B, and application programs and instructions 134B.

The operating system 132B may manage computer hardware and software resources, provide common services for computer programs, schedule tasks, allocate memory, manage input/output functions, and perform other functions. The operating system may be a multi-tasking, multi-user operating system. The operating system may be a templated operating system that creates a single virtual machine image as a guest operating system then saving it as a tool for multiple running virtual machines (which may be used with respect to a cloud computing system).

As discussed elsewhere herein, the transition time detector 102B may be configured to detect when an access control transition time has occurred using the transition time rules 120B. The transition event detector 104B may be configured to detect when an access control transition event has occurred using the transition event rules 122B. The transition warning detector 106B may be configured to predict, using the transition warning rules 124B and/or transition event prediction models, when a transition event or time is upcoming.

The access list interface generator 110B is configured to generate a sharing authorization interface. The access list interface generator 110B may generate the sharing authorization interface using information stored in the user accounts records 132B and using rules indicating for which entities access may not be withdrawn (e.g., for historical data and/or future data).

The authenticator service 112B is configured to authenticate users and/or devices with respect to accessing certain services and/or data. For example, the authenticator service 112B may use multi-factor authentication, a one-time password, a hardware token, biometrics (e.g., fingerprint, face print, voice print, pupil print, etc.), or some combination of the foregoing to perform authentication as described herein.

The access controller service 114B is configured to determine who is the current access controller for a given set of data and who is to be the future access controller.

The message generator 108B is configured to generate messages/notifications to access controllers and those granted access in response to determinations may by the transition time detector 102B, the transition event detector 104B, the transition warning detector 106B, and/or the access controller service 114B.

The user accounts records 132B for users whose data is being shared may include user identifiers, age, sex, gender identification, medical status, user authentication data, contact data (e.g., email address, physical address, SMS/MMS address/phone number, and/or other contact data), user medical service provider information (e.g., names, physical addresses, SMS/MMS addresses/phone numbers, and/or other contact data), legal data (e.g., whether the user is under a conservatorship), opt-in instructions, and/or other data discussed herein. The user accounts records 132B may include locators (e.g., URLs) associated with the data sources that store user data (e.g., medical records). For example, a locator may be a link in the form of a schema object stored in the account database record that enables access objects in the linked to data source. The locator may be requested from or pushed by the controller (e.g., medical service provider) of the data source. Data accessed from a data source may be copied by and stored in a database maintained by the secure multimedia distributed content management system 104.

User records for users that are being granted access to another data (e.g., medical data) may optionally not include certain data, such as user medical service provider information or user opt-in instructions if such data is not relevant to the user.

Figure 2:
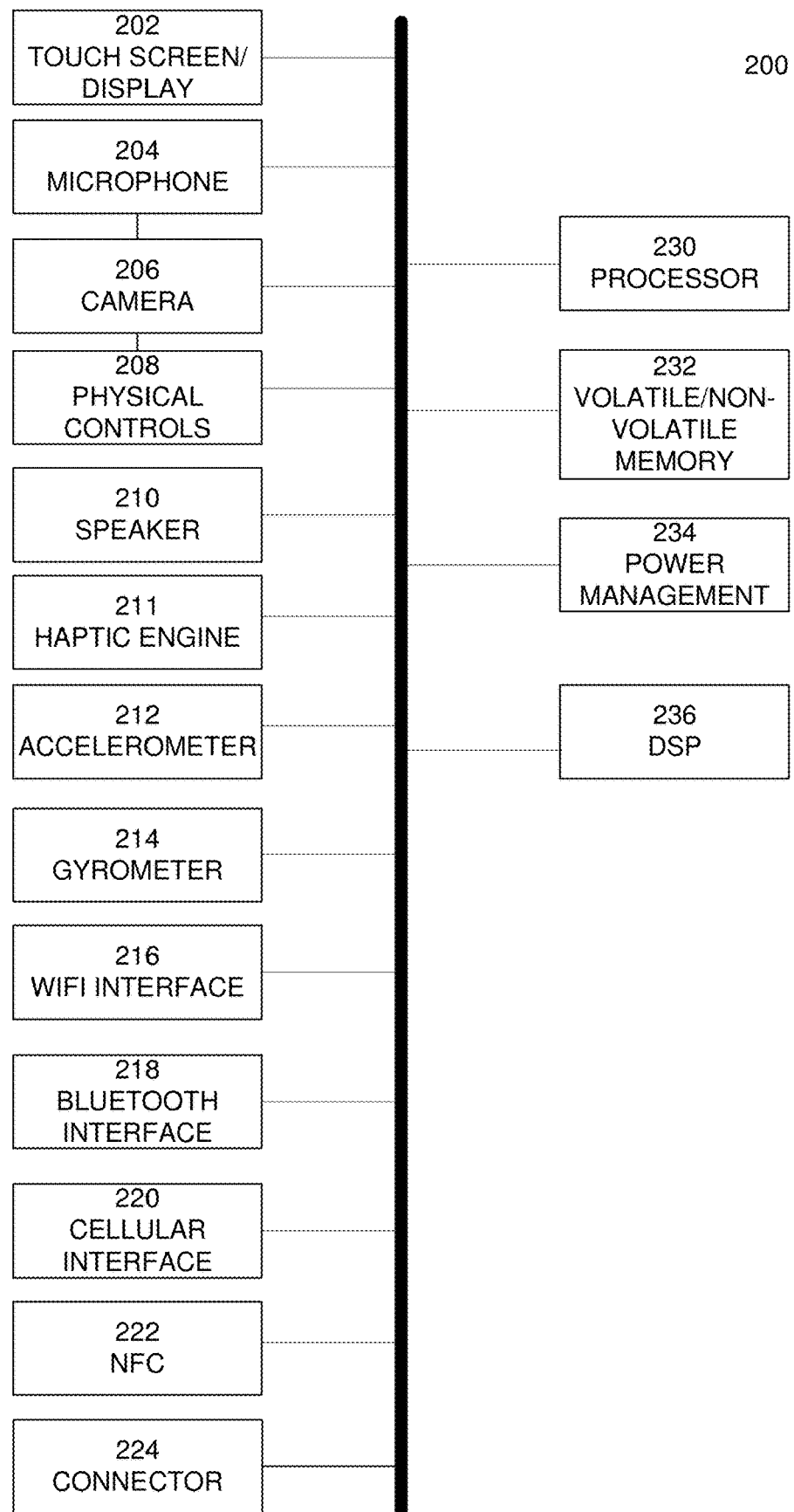
FIG. 2 illustrates an example user terminal architecture.

FIG. 2 illustrates an example user terminal 200 in the form of a tablet, phone, laptop, or appliance. In the example illustrated in FIG. 2, the user terminal 200 includes various user input/output devices, such as a touchscreen/display 202, a microphone 204, a camera 206, physical controls 208 (e.g., a power on/off control, a volume control, a home control, etc.), a speaker 210, and/or other user input/output devices. The user terminal 200 may optionally include a haptic engine 211 that provides kinesthetic communication to the user (e.g., via vibrations or taps, which may be used to confirm a user input or to provide a notification), an accelerometer 212 that measures acceleration in 2-3 directions, and/or a gyrometer (e.g., a 3-axis gyroscope) 214 that measures orientation in three axis. The user terminal 200 may be equipped with an external or integral physical keyboard, trackpad, joystick, electronic pen, and/or other input device.

The user terminal 200 may include one or more wireless and/or wired interfaces. For example, the user terminal 200 may include a WiFi interface 216, a Bluetooth interface 218, a cellular interface 220, an NFC (near field communication) interface 222, and/or one or more physical connectors 224 (e.g., a USB connector, a LIGHTING connector, and/or other connector). The user terminal 200 further comprises a processor device (e.g., a microprocessor) 230, volatile memory (e.g., RAM solid state memory) and non-volatile memory (e.g., FLASH memory), and a power management device 234.

A data sharing application (e.g., an app configured to interface with, receive data from, and transmit data to the secure multimedia distributed content management system 104) may be utilized to transmit input received from a user (e.g., a patient or someone with access to patient data) via the terminal 200 input devices. For example, the user input may be provided via voice, keyboard, touch screen, or otherwise.

The data sharing application may be provided or accessed in the form of any application obtained/downloaded by the user terminal 200 via a third party application store and/or via the system 104.

The data sharing application may render user interfaces that may include a variety of data entry fields. The fields may be populated via a keyboard, a stylus, via voice entry (provided via the microphone 204) which may be converted to text via a voice-to-text module, or via facial, limb, or figure gestures captured by the camera 206. The keyboard and/or stylus may be included with the user terminal 200.

Figure 3A:
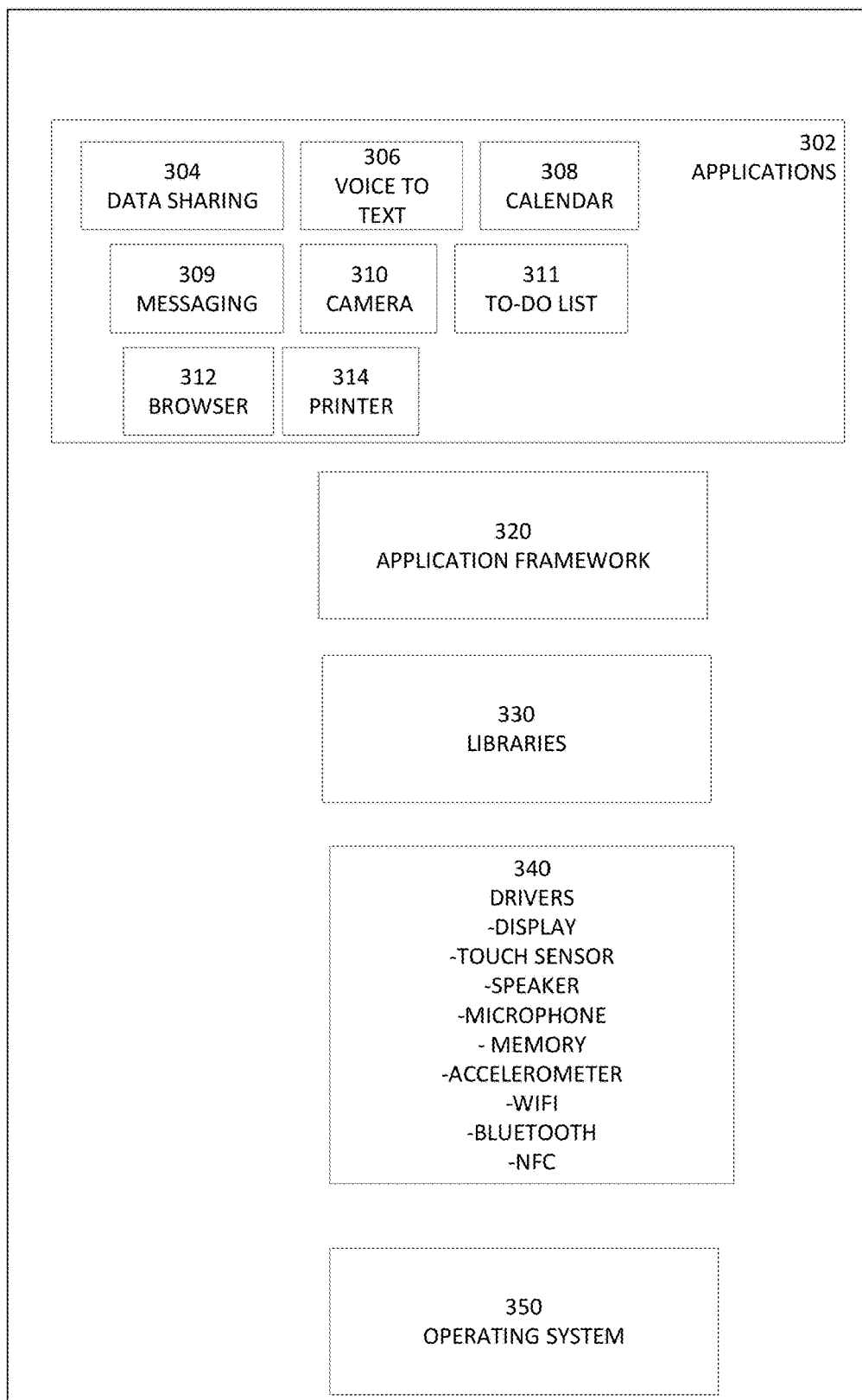
FIG. 3A illustrates an example software architecture for the example user terminal.

FIG. 3A illustrates an example, optional software architecture for a touch-enabled version of the example user terminal 200 illustrated in FIG. 2. The software architecture may include an operating system 350 (e.g., GOOGLE ANDROID, APPLE iOS, MICROSOFT WINDOWS, APPLE OS, UNIX, LINUX, etc.), drivers 340 (e.g., display, touch sensor, speaker, microphone, memory, accelerometer, WiFi, Bluetooth, NFC, etc.), libraries 330 (e.g., SSL, Webkit, SQL, etc.), an application framework 320, and applications 302. For example, the applications 302 may include a data sharing application 304, a voice-text application 306, a calendar application 308, a messaging application 309, a camera application 310, a to-do list application 311, a browser application 312, a printer application 314 and/or other applications. A given application may utilize another application as part of its operation. For example, the data sharing application 304 may call the voice-text application 306, the calendar application 308, the messaging application 309, the camera application 310, the to-do list application 311, the browser application 312, and/or the printer application 314. Two or more of the applications may be integrated into a single application. The data sharing application 304 may be configured to perform some or all of the functions and processes described herein.

Figure 3B:
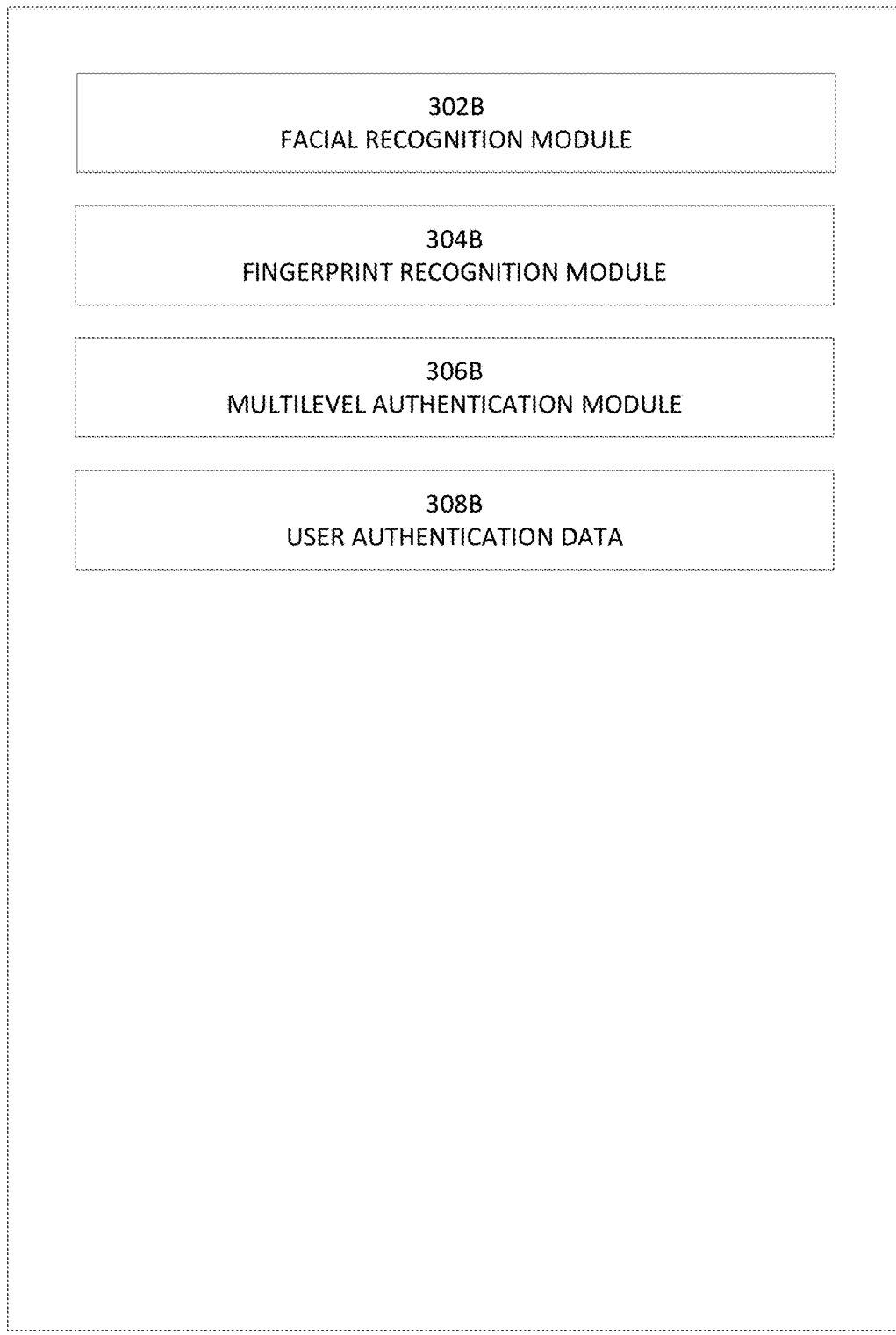
FIG. 3B illustrates an example authenticator subsystem architecture.

FIG. 3B illustrates an example authenticator subsystem that may be included in the applications 302 (e.g., in the data sharing application 304), that may be utilized to authenticate a user and to determine what data and application rights the user is to be granted. As illustrated, the authenticator subsystem may include a facial recognition module 302B configured to recognize a user based on an image captured with a user device camera. Features extracted from the image may be compared to stored features of an authorized user. If there is a match, the user may be granted with corresponding rights (e.g., access may be granted to certain application functions and/or user information). If the facial features fail to match, the user may not be granted such rights. A fingerprint recognition module 304B may be configured to authenticate a user based on a comparison of features of the fingerprint captured using the optical or capacitive fingerprint sensor with stored features of an authorized user's fingerprint. A multilevel authentication module 306B may be configured to enable a user to be authenticated using two or more types of authentication. For example, as similarly discussed elsewhere herein, the multilevel authentication module 306B may be configured to generate a one-use password based on a user PIN and another item of data. User authentication data 308B may store user data (e.g., fingerprint features, facial print features, etc.) utilized by the authenticator subsystem to authenticate the user.

Referring now to FIG. 4, an example process for transitioning access control to secure data is illustrated. Optionally, the process may be executed in whole or in part by the secure multimedia distributed content management system described herein. As will be discussed a transition time and/or transition event may be detected, and at least partially in response, data access control may be transitioned and data access controls may be modified.

At block 402, a time generator is monitored. For example, the time generator may include a calendar circuit configured to generate current date/time data. The time generator may optionally be remote from the multimedia distributed content management system and may be accessed over a network.

At block 404, a determination is made as to whether the current date and/or time corresponds to an access control transition time. For example, a data store of access transition times or rule may be queried. By way of illustration, a transition time may be specified as an absolute time (e.g., a specific date and time) or as a relative time (e.g., a certain number of days or years from a reference date and/or time). As similarly discussed elsewhere herein, a transition time may be 18 years from the birth of a child with respect medical records of the child. Thus, the current time may be compared to the transition time, and if the transition time matches the current time, then a determination is made that a transition time has occurred. If a transition time has occurred, the process may proceed to block 410.

At block 406, one or more transition events are monitored. The transition events to be monitored may be specified in a transition event specification record or via a transition rules store. For example, an event may be a medical-related event, such as a birth. By way of further example, an event may be a conservatorship appointed for a user to home the data belongs or is associated with. For example, current events associated with the user may be determined by monitoring medical records stored in a medical health records data store associated with the user or via an event input user interface.

At block 408, a determination is made as to whether a transition event has occurred. For example, current events associated with the user may be compared with a set of previously specified transition event types (e.g., child birth, conservatorship appointment). If a current event corresponds to a previously specified transition event type, then the process may proceed to block 410.

At block 410, the current controller of access to the data is determined. For example, if the data is medical data of a child, the current controller of access to the data may be a parent. If the data is medical data of an adult for whom a conservatorship has been appointed (e.g., because the adult is suffering from dementia), the current controller of access to the data may be the adult.

At block 412, a determination is made as to entities that have been authorized to access the data by the current controller. For example, such entities may include family members, caretakers, medical service providers, insurance providers, etc.

At block 414, a determination is made as to who is to be the new controller of access to the data. The determination may be made from a pre-specified record. For example, a given stored transition time may be stored in association with a corresponding access controller identifier (e.g., as a transition time—access controller pair). Similarly, a given stored transition event may be stored in association with a corresponding access controller identifier (e.g., as a transition event—access controller pair).

At block 416, an sharing authorization interface is generated. The sharing authorization interface may include some or all of the entities identified at block 412. Optionally, a determination may be made as to whether the new access controller is authorized to withdraw access to historical data (e.g., data that existed prior to the transition detection) and/or withdraw access to future data. The authorization interface may include an authorization control for historical data and/or future data for a given entity. For example, if it is determined that the new access controller is not authorized to withdraw access to historical data, a historical access control may not be presented, and optionally instead an indication (e.g., text, graphic, or otherwise) may be provided indicating that the access controller is not authorized to withdraw access to historical data. Similarly, if it is determined that the new access controller is not authorized to withdraw access to new data, a historical access control may not be presented, and optionally instead an indication (e.g., text, graphic, or otherwise) may be provided indicating that the access controller is not authorized to withdraw access to new data.

Optionally, data may be categorized into subsets of data types, where each data type is associated with corresponding authorization controls. Such categorization of data enables data types to be selectively shared. For example, one subset of data may relate to non-financial medical information, and another subset of data may relate to medical insurance data.

Optionally, entities listed on the sharing authorization interface may be categorized based on their relationship to the access controller or their function. For example, an entity may be categorized as a family member, conservator, medical service provider, insurance provider, and/or the like. Optionally, the sharing authorization interface may enable additional entities to be added and may enable such entities to be categorized.

At block 418, the process receives, via the authorization interface, sharing instructions for past and/or future data (e.g., using the authorization controls discussed above). At block 420, access instructions are generated in accordance with the sharing instructions received via the authorization interface. Such instructions may be transmitted to data store operators that control the data being shared. Such instructions may include identifiers associated with authorized entities (e.g., names, email addresses, SMS addresses, etc.) and entities that are no longer authorized to access the data.

At block 422, notifications are generated and transmitted to those entities on the sharing authorization interface indicating what data the corresponding entity is authorized to access and not authorized to access. The notification may include a locator (e.g., a URL or other link) to a downloadable application and/or a webpage via which the entity can access data in accordance with its authorization.

Optionally, prior to a transition event or time actually occurring, a prediction of a transition event or time may be generated. In response to predicting such transition event or time, a notification of the predicted event or time may be generated and transmitted to the current access controller, the future, new access controller, and/or some or all of those currently authorized to have access to the data. An example process that generates such notifications is illustrated in FIG. 5.

Figure 5:
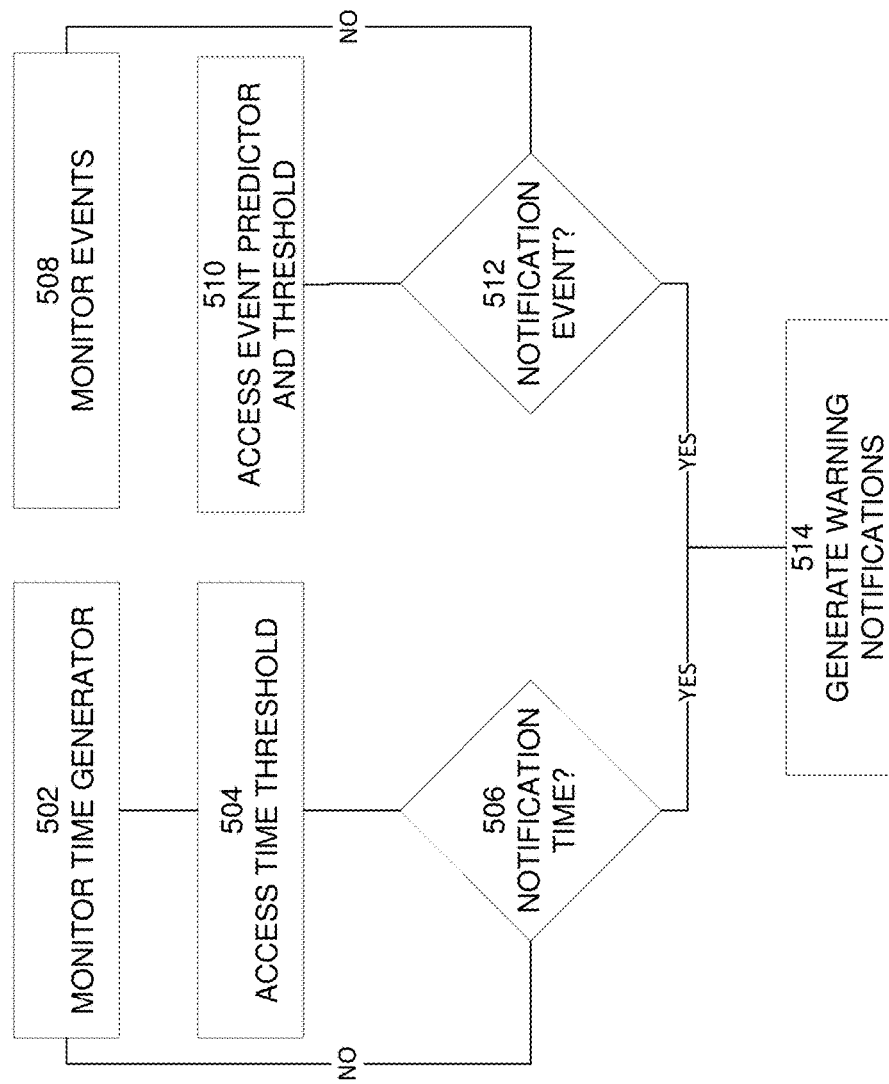
FIG. 5 illustrates an example process for predicting an access transition event.

Referring to FIG. 5, at block 502, a time generator is monitored. For example, the time generator may include a calendar circuit configured to generate current date/time data. At block 504, a threshold period of time (e.g., 5 days, 2 weeks, 1 month, 2 months, or other time period) is accessed from a threshold data store. At block 506, a determination is made as to whether the current date and/or time is within (and prior to) a threshold period of time (e.g., 5 days, 2 weeks, 1 month, 2 months, or other time period) of an access control transition time. As similarly discussed elsewhere herein, a transition time may be 18 years from the birth of a child with respect medical records of the child. Thus, the current time may be compared to the transition time, and if the transition time is a threshold amount of time after the current time, then a determination is made that a transition notification time has occurred. If a transition notification time has occurred, the process may proceed to block 514.

At block 508, one or more events are monitored that may be indicative of a future transition events. The events to be monitored may be specified in an transition event prediction specification record or via a transition event prediction rules store. For example, an event may be a medical-related event, such as a fetus conception date. For example, events associated with the user may be determined by monitoring medical records stored in a medical health records data store associated with the user or via an event input user interface.

At block 510, one or more transition event predictor models are accessed, where a given transition event predictor model is configured to predict when and/or if a given transition event will occur using corresponding data. For example, a transition event predictor model may be configured to predict a delivery date for a pregnant woman (e.g., based on the conception date, the woman's age, health conditions, and/or the like).

At block 512, a determination is made as to whether the current date and/or time is within (and prior to) a threshold period of time (e.g., 5 days, 2 weeks, 1 month, 2 months, or other time period) of the predicted access control transition event.

If a determination is made as that the current date and/or time is within (and prior to) a threshold period of time (e.g., 5 days, 2 weeks, 1 month, 2 months, or other time period) of the transition notification time or the predicted access control transition event, then, at block 514, warning notifications may be generated that indicate when the transition time or event will or is predicted to occur. Such notifications may be transmitted to the current access controller, the future, new access controller, and/or some or all of those currently authorized to have access to the data. Optionally, in addition to providing a warning notification, the future, new access controller may be presented with a generated sharing authorization interface showing the current access permissions. The sharing authorization interface may enable the future, new access controller to provide opt-in instructions which may be saved and implemented upon detection of the actual access control transition.

Figure 6:
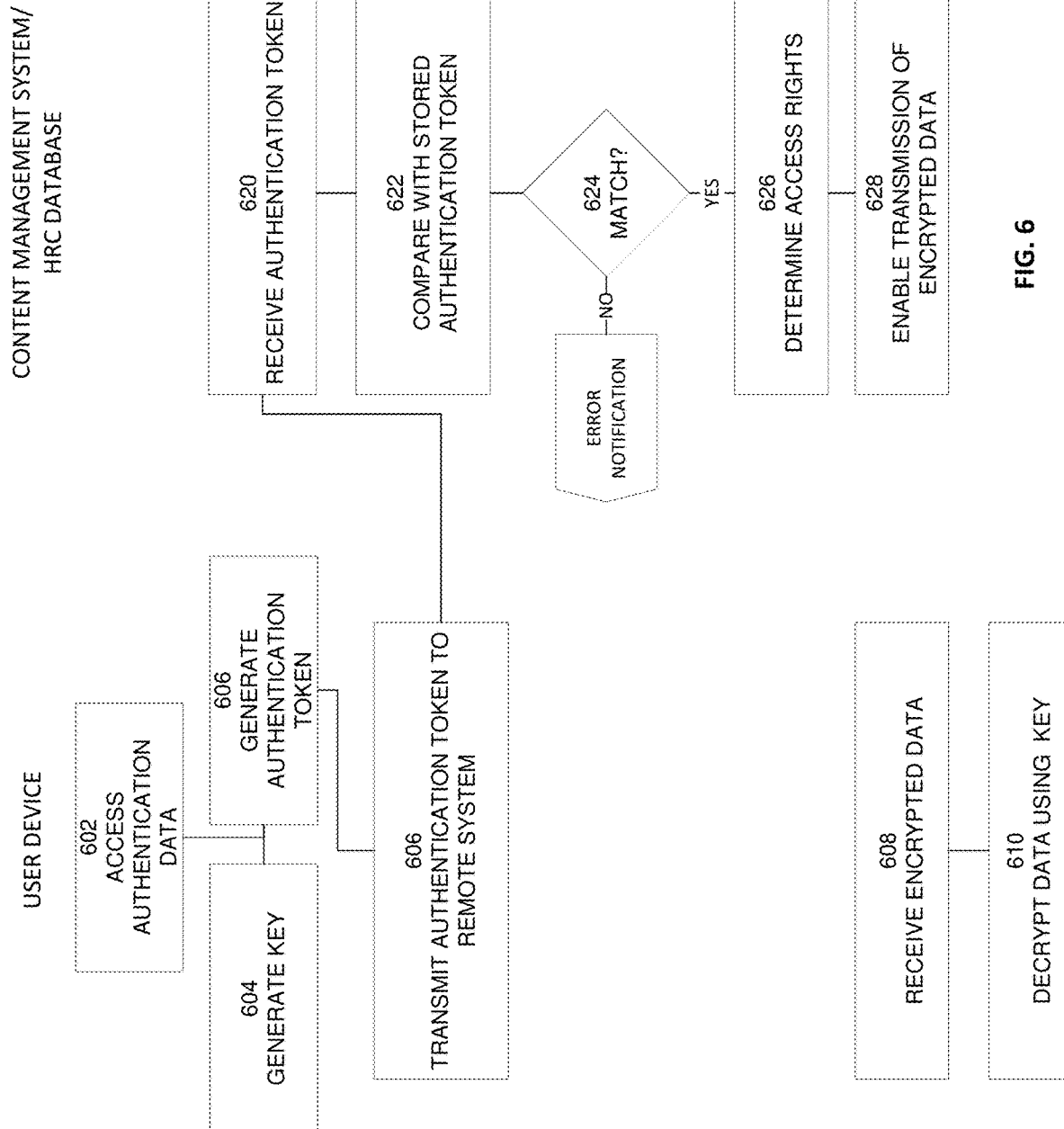
FIG. 6 illustrates an example process of secure communication between a user device and a data source.

FIG. 6 illustrates an example process of secure communication between a user device and a data source (e.g., the secure multimedia distributed content management system or an electronic health records database). At block 602, the user device may access local user authentication data (e.g., a password received from the user, biometric data of the user, and/or the like). At block 604, a key is generated using the authentication data. At block 606, an authentication token is generated. The authentication token may be different than the authentication data and different than the key. For example the authentication data may be generated using a key derivation function, such as Password-Based Key Derivation Function 1 (PBKDF1) or PBKDF2. Optionally, the PBKDF may be applied hundreds, thousands, or millions of times (or more narrowly, between 100 and 50,000 applications) to make it extremely difficult for an adverse party (e.g., a hacker) to determine the authentication token using brute force guessing. For example, a 90 bits password processed using 4500 PBKDF2, may take trillions of years to guess, even with a high powered graphical processing unit.

At block 606, the authentication token is transmitted to the data source. Advantageously, the key is not transmitted from the user device, thereby further enhancing security and preventing the interception of the key. At block 620, the data source receives the authentication token. At block 622, the received authentication token may be compared with a locally stored authentication token. At block 624, a determination is made as to whether the received authentication token corresponds to the stored authentication token. If the received authentication token does not correspond to the stored authentication token, an error message indicating the failure may be generated and transmitted to the user device.

If the received authentication token does correspond to the stored authentication token, a determination is made (using the authentication token, which maps to the user identity), as to which records the user is entitled to access (e.g., medical records of another user or medical records of the accessing user). For example, the authentication token may be used to identify user access rights via a corresponding user account record. At block 628, the transmission of authorized encrypted data, encrypted using cryptographic techniques, is enabled to be transmitted from the data source to the user device. At block 608, the encrypted data is received by the user device. At block 610, the user device decrypts the encrypted data using the key. The decrypted data may then be displayed, processed, or otherwise used by the user device.

FIG. 7 illustrates an example access authorization user interface. The example access authorization user interface may enable a new access controller to provide opt-in instructions which may be saved and implemented upon detection of the actual access control transition. In addition, the example access authorization interface may be used by an access controller to change previously provided opt-in instructions. Optionally, when the example access authorization interface is generated and rendered, it may reflect the current opt-in instructions provided by the access controller (or by an immediately previous access controller that provided the last opt-in instructions for the set of data at issue), which may then be changed as permitted.

In this example, the access authorization user interface lists entities that had been authorized to access the data set at issue, where each listed entity may optionally be presented with one or more opt-in controls. If an opt-in control is de-activated, then data access may be denied to the corresponding entity. Optionally, two opt-in controls are provided, one for historical data (e.g., data that existed prior to the transition or prior to the activation of the historical opt-in control), and one for future data. Optionally, as illustrated, certain entities may only have an associated historical opt-in control, and certain entities may only have an associated future opt-in control. Optionally, as illustrated, certain entities may not have any opt-in control as data sharing with such entities may not be changed by the user.

Optionally, entities listed on the access authorization user interface may be categorized based on their relationship to the access controller or their function. For example, an entity may be categorized as a family member, conservator, medical service provider, insurance provider, and/or the like.

Optionally, the access authorization interface may enable additional entities to be added and may enable such entities to be categorized. For example, an "add new entity" control or the like may be presented. In response to the user activating the "add" control, an add entity user interface will be presented via which the user may enter (or select from a menu) an entity with whom data will be shared. The add entity user interface may include fields configured to receive the added entity's contact information (e.g., email address, SMS/MMS address/phone number, physical address, etc.). Optionally, a field and/or a menu may be provided via which the user can specify an entity category for the new entity (e.g., family member, medical service provider, conservator, insurance provider, etc.). The access authorization user interface may be automatically re-generated and re-rendered with the new entity listed in the corresponding category.

Thus, as discussed herein, methods and systems are described that enable communication of data and information, including multimedia data, among disparate systems in a secure and controlled manner.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A secure access control system configured to control access to sensitive data stored on disparate data sources, secure access control system comprising:
    a network interface;
    at least one computing device;
    computer readable memory including instructions operable to be executed by the at least one computing device to perform a set of actions, configuring the at least one computing device to at least:
        receive, via the network interface, locators associated with respective disparate data sources that store encrypted data associated with a second entity;
        determine a first entity that is designated to control access to second entity data;
        receive, via the network interface, an authentication token from the first entity;
        determine if the received authentication token is valid;
        at least partly in response to determining that the received authentication token is valid, grant the first entity with access to at least a portion of the second entity data;
        at least partly in response to determining that the first entity is designated to control access to second entity data, enable an access control interface to be instantiated on a first entity device, the access control interface configured to enable the first entity to selectively grant or withdraw access to second entity data, wherein the access control interface comprises an identification of a first plurality of entities;
        receive, via the network interface, from the first entity device access grant and/or access withdrawal indications provided via the access control interface with respect to one or more entities in the first plurality of entities;
        grant or withdraw access to the second entity data in accordance with the received access grant and/or access withdrawal indications;
        enable respective entities in the first plurality of entities, granted access by the first entity, to access over a network at least a portion of the second entity data from a first plurality of disparate data sources;
        retrieve one or more access control transition time rules;
        monitor a current time;
        based at least in part on the monitored current time and the one or more access control transition time rules, determine whether access control of the second entity data is to be transitioned from the first entity to the second entity;
        based at least in part on a determination that the access control of the second entity data is to be transitioned from the first entity to the second entity, enable the second entity to provide, via a second entity device, access grant and/or access withdrawal indications with respect to one or more entities in the first plurality of entities;
        receive from the second entity device access grant and/or access withdrawal indications provided by the second entity with respect to one or more entities in the first plurality of entities;
        grant or withdraw access to the second entity data in accordance with the received access grant and/or access withdrawal indications with respect to one or more entities in the first plurality of entities; and
        enable respective entities in the first plurality of entities, granted access by the second entity to second entity data, to access over a network the second entity data from at least a portion of the first plurality of disparate data sources.

2. The secure access control system as defined in claim 1, wherein the received authentication token is generated using a key derivation function applied to a passcode between 100 and 50,000 times.

3. The secure access control system as defined in claim 1, wherein the access control interface comprises a categorization of the first plurality of entities into a plurality of categories based at least in part on functions performed by entities in the first plurality of entities.

4. The secure access control system as defined in claim 1, wherein the secure access control system is configured to cause the access control interface to be generated based at least in part on a determination as to whether the second entity has permission to withdraw from a given entity access to a first type of second entity data, and at least partly in response to determining that the second entity does not have permission to withdraw from the given entity access to the first type of second entity data, inhibiting inclusion of a first access control, corresponding to the first type of second entity data, in the access control interface.

5. The secure access control system as defined in claim 1, wherein the secure access control system comprises a hosted computing environment including a collection of remotely accessible physical computing resources configured to be provisioned in real time at least partly in response to computer resource demands.

6. The secure access control system as defined in claim 1, wherein the secure access control system comprises a hosted storage environment that includes a collection of remotely physical data storage devices configured to be provisioned in real time at least partly in response to data storage resource demands.

7. The secure access control system as defined in claim 1, wherein the set of actions further comprises:
    use a first event prediction model to predict a future occurrence of a first event;
    retrieve a first time threshold;
    based at least in part on the first event prediction model predicting a future occurrence of the first event and the first time threshold, determine whether a first access control transition notification is to be generated;
at least partly in response to determining that the first access control transition notification is to be generated, generate the first access control transition notification, and enable the first access control transition notification to be transmitted to a plurality of destinations.

8. The secure access control system as defined in claim 1, wherein the set of actions further comprises:
monitor one or more events;
based at least in part on the monitoring of one or more events and at least one access control transition event rule, determine whether access control of the second entity data is to be transitioned from the second entity to a different entity;
based at least in part on a determination that the access control of the second entity data is to be transitioned from the second entity to the different entity, enable the different entity to provide, via a device of the different entity, access grant and/or access withdrawal indications with respect to one or more entities in the first plurality of entities;
receive from the device of the different entity access grant and/or access withdrawal indications with respect to one or more entities in the first plurality of entities;
grant or withdraw access to the second entity data in accordance with the received access grant and/or access withdrawal indications with respect to one or more entities in the first plurality of entities from the device of the different entity; and
enable respective entities in the first plurality of entities, granted access by the different entity to second entity data, to access over a network the second entity data from at least a portion of the first plurality of disparate data sources.

9. The secure access control system as defined in claim 1, wherein the second entity data comprises medical imaging data.

10. A computer-implemented method comprising:
under control of a hardware computing device configured with specific computer-executable instructions:
receiving, via a network interface, identifiers associated with a plurality of data stores that store encrypted data associated with a second entity;
determining a first entity that is designated to control access to second entity data;
receiving, via the network interface, an authentication token from a device the first entity:
at least partly in response to determining that the authentication token is valid, granting the first entity with access to at least a portion of the second entity data;
at least partly in response to determining that the first entity is designated to control access to second entity data, enabling an access control interface to be provided by a first entity device, the access control interface configured to enable the first entity to selectively grant or withdraw access to second entity data with respect to entities in the first plurality of entities;
receiving, via the network interface, from the first entity device access grant and/or access withdrawal indications provided via the access control interface with respect to entities in the first plurality of entities;
granting or withdrawing access to the second entity data in accordance with the received access grant and/or access withdrawal indications with respect to entities in the first plurality of entities;

enabling respective entities in the first plurality of entities, granted access by the first entity, to access at least a portion of the second entity data from a first plurality of disparate data sources;
retrieving access control transition event rules for one or more medically-related events and/or retrieving access control transition time rules;
monitoring one or more medically-related events and/or monitoring a current time;
based at least in part on the monitored one or more medically-related events and the access control transition event rules, and/or the monitored current time and the access control transition time rules, determining whether access control of the second entity data is to be transitioned from the first entity to the second entity;
based at least in part on a determination that the access control of the second entity data is to be transitioned from the first entity to the second entity, enabling the second entity to provide, via a second entity device, access grant and/or access withdrawal indications with respect to entities in the first plurality of entities;
receiving from the second entity device access grant and/or access withdrawal indications with respect to entities in the first plurality of entities;
granting or withdrawing access to the second entity data in accordance with the received access grant and/or access withdrawal indications; and
enabling respective entities in the first plurality of entities, granted access by the second entity to second entity data, to access over a network the second entity data from at least a portion of the first plurality of disparate data sources.

11. The computer-implemented method as defined in claim 10, wherein the received authentication token is generated using a key derivation function applied to a passcode between 100 and 50,000 times.

12. The computer-implemented method as defined in claim 10, wherein the access control interface comprises a categorization of the first plurality of entities into a plurality of categories based at least in part on functions performed by entities in the first plurality of entities.

13. The computer-implemented method as defined in claim 10, the method further comprising enabling generation of an instantiation of the access control interface based at least in part on a determination as to whether the second entity has permission to withdraw from a given entity access to a first type of second entity data, and at least partly in response to determining that the second entity does not have permission to withdraw from the given entity access to the first type of second entity data, inhibiting inclusion of a first access control in the access control interface.

14. The computer-implemented method as defined in claim 10, the method further comprising:
using a first event prediction model to predict a future occurrence of a first event;
retrieving a first time threshold;
based at least in part on the first event prediction model predicting a future occurrence of the first event and the first time threshold, determining whether a first access control transition notification is to be generated;
at least partly in response to determining that the first access control transition notification is to be generated, generating the first access control transition notification, and enabling the first access control transition notification to be transmitted to one or more destinations.

15. The computer-implemented method as defined in claim 10, the method further comprising:
  monitoring one or more medically-related events;
  based at least in part on the monitoring of one or more medically-related events and one or more access control transition event rules, determining whether access control of the second entity data is to be transitioned from the second entity to a different entity;
  based at least in part on a determination that the access control of the second entity data is to be transitioned from the second entity to the different entity, enabling the different entity to provide, via a device of the different entity, access grant and/or access withdrawal indications with respect to one or more entities in the first plurality of entities;
  receiving from the device of the different entity access grant and/or access withdrawal indications with respect to one or more entities in the first plurality of entities;
  granting or withdrawing access to at least a portion of the second entity data in accordance with the received access grant and/or access withdrawal indications; and
  enabling respective entities in the first plurality of entities, granted access by the different entity to second entity data, to access over a network the second entity data from at least a portion of the first plurality of disparate data sources.

16. The computer-implemented method as defined in claim 10, wherein the second entity data comprises medical imaging data.

17. A non-transitory computer-readable storage medium storing computer-executable instructions that when executed by a processor cause the processor to perform operations comprising:
  determine a first entity that is designated to control access to second entity data;
  receive authentication data from the first entity;
  use the receive authentication data to authenticate the first entity;
  at least partly in response to authenticating the first entity, grant the first entity with access to at least a portion of the second entity data;
  at least partly in response to determining that the first entity is designated to control access to second entity data, enable an access control interface to be provided by a first device, the access control interface configured to enable the first entity to selectively grant or withdraw access to second entity data with respect to entities in a first plurality of entities to be instantiated on a first entity device;
  receive from the first entity device access grant and/or access withdrawal indications provided via the access control interface with respect to one or more entities in the first plurality of entities;
  grant or withdraw access to the second entity data in accordance with the received access grant and/or access withdrawal indications;
  enable respective entities in the one or more entities, granted access by the first entity, to access at least a portion of the second entity data;
  retrieve access control transition event rules for one or more medically-related events and/or retrieve access control transition time rules;
  monitor one or more medically-related events and/or monitor a current time;
  based at least in part on the monitored one or more medically-related events and the access control transition event rules, and/or the monitored current time and the access control transition time rules, determine whether access control of the second entity data is to be transitioned from the first entity to the second entity;
  based at least in part on a determination that the access control of the second entity data is to be transitioned from the first entity to the second entity, enable the second entity to provide, via a second entity device, access grant and/or access withdrawal indications with respect to entities in the first plurality of entities;
  receive from the second entity device access grant and/or access withdrawal indications provided via the access control interface with respect to entities in the one or more entities;
  grant or withdraw access to the second entity data in accordance with the received access grant and/or access withdrawal indications from the second entity device; and
  enable respective entities in the one or more entities, granted access by the second entity to second entity data, to access over a network the second entity data from one or more data sources.

18. The non-transitory computer-readable storage medium as defined in claim 17, wherein the received authentication data is generated using a key derivation function applied to a passcode between 100 and 50,000 times.

19. The non-transitory computer-readable storage medium as defined in claim 18, the operations further comprising generation of the access control interface, wherein the access control interface comprises a categorization of the one or more entities into a plurality of categories based at least in part on functions performed by entities in the one or more entities.

20. The non-transitory computer-readable storage medium as defined in claim 17, the operations further comprising generation of the access control interface using a determination as to whether the second entity has permission to withdraw from a given entity access to a first type of second entity data, and at least partly in response to determining that the second entity does not have permission to withdraw from the given entity access to the first type of second entity data, inhibiting inclusion of a first access control in the access control interface.

21. The non-transitory computer-readable storage medium as defined in claim 18, wherein the operations further comprise:
  use a first event prediction model to predict a future occurrence of a first event;
  retrieve a first time threshold;
  based at least in part on the first event prediction model predicting a future occurrence of the first event and the first time threshold, determine whether a first access control transition notification is to be generated;
  at least partly in response to determining that the first access control transition notification is to be generated, generate the first access control transition notification, and enable the first access control transition notification to be transmitted to one or more destinations.

22. The non-transitory computer-readable storage medium as defined in claim 18, wherein the operations further comprise:
  monitor one or more medically-related events;
  based at least in part on the monitoring of one or more medically-related events and one or more access control transition event rules, determine whether access control of the second entity data is to be transitioned from the second entity to a different entity;

based at least in part on a determination that the access control of the second entity data is to be transitioned from the second entity to the different entity, enable the different entity to provide, via a device of the different entity, access grant and/or access withdrawal indications with respect to one or more entities in the first plurality of entities;

receive from the device of the different entity access grant and/or access withdrawal indications with respect to one or more entities in the first plurality of entities;

grant or withdraw access to the second entity data in accordance with the received access grant and/or access withdrawal indications; and enable respective entities in the first plurality of entities, granted access by the different entity to second entity data, to access over a network the second entity data from at least a portion of a first plurality of disparate data sources.

23. The non-transitory computer-readable storage medium as defined in claim 18, wherein the second entity data comprises medical imaging data.

* * * * *